United States Patent
Melanson

(10) Patent No.: US 8,076,920 B1
(45) Date of Patent: Dec. 13, 2011

(54) SWITCHING POWER CONVERTER AND CONTROL SYSTEM

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 114 days.

(21) Appl. No.: 11/864,121

(22) Filed: Sep. 28, 2007

Related U.S. Application Data

(60) Provisional application No. 60/894,295, filed on Mar. 12, 2007, provisional application No. 60/915,547, filed on May 2, 2007.

(51) Int. Cl.
*G05F 5/00* (2006.01)
*H05B 41/16* (2006.01)

(52) U.S. Cl. .......................... 323/299; 315/247

(58) Field of Classification Search .............. 363/15, 363/16, 74, 78, 79, 100, 108, 143, 89, 39, 363/44, 45, 46; 323/242, 246, 259, 268, 323/282–285, 288, 344, 351, 905, 207, 299; 324/410–412; 315/225, 247
See application file for complete search history.

(56) References Cited

U.S. PATENT DOCUMENTS

| | | |
|---|---|---|
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |

(Continued)

FOREIGN PATENT DOCUMENTS

DE 19713814 10/1998

(Continued)

OTHER PUBLICATIONS

Freescale Semiconductor, Inc., Dimmable Light Ballast with Power Factor Correction, Design Reference Manual, DRM067, Rev. 1, Dec. 2005.

(Continued)

*Primary Examiner* — Adolf Berhane
*Assistant Examiner* — Emily Pham
(74) *Attorney, Agent, or Firm* — Hamilton & Terrile, LLP; Kent B. Chambers

(57) ABSTRACT

A switching power converter tracks a time-varying input voltage during each cycle of the input voltage to provide power factor correction. The switching power converter includes a switch with a frequency and duty cycle modulated control signal. The switch controls the transfer of energy between the input and output of the switching power converter. The frequency of the control signal is greater than a frequency of the input signal. The control signal frequency is modulated during each cycle of the input voltage so that energy transferred from the switching power tracks the energy supplied to the switching power converter.

25 Claims, 7 Drawing Sheets

U.S. PATENT DOCUMENTS

| | | | |
|---|---|---|---|
| 4,979,087 A | 12/1990 | Sellwood et al. | |
| 4,980,898 A | 12/1990 | Silvian | |
| 4,992,919 A | 2/1991 | Lee et al. | |
| 4,994,952 A | 2/1991 | Silva et al. | |
| 5,001,620 A | 3/1991 | Smith | |
| 5,055,746 A | 10/1991 | Hu et al. | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,442,539 A * | 8/1995 | Cuk et al. | 363/89 |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,642,267 A * | 6/1997 | Brkovic et al. | 363/16 |
| 5,691,890 A | 11/1997 | Hyde | |
| 5,747,977 A | 5/1998 | Hwang | |
| 5,757,635 A | 5/1998 | Seong | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,900,683 A | 5/1999 | Rinehart et al. | |
| 5,912,812 A * | 6/1999 | Moriarty, Jr. | 363/89 |
| 5,914,572 A * | 6/1999 | Qian et al. | 315/307 |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,962,989 A | 10/1999 | Baker | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,091,233 A | 7/2000 | Hwang | |
| 6,125,046 A | 9/2000 | Jang et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,369,525 B1 | 4/2002 | Chang et al. | |
| 6,385,063 B1 | 5/2002 | Sadek et al. | |
| 6,407,514 B1 | 6/2002 | Glaser et al. | |
| 6,407,515 B1 | 6/2002 | Hesler | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,531,854 B2 * | 3/2003 | Hwang | 323/285 |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,657,417 B1 | 12/2003 | Hwang | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Andersen et al. | |
| 6,753,661 B2 | 6/2004 | Muthu et al. | |
| 6,756,772 B2 | 6/2004 | McGinnis | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 * | 9/2005 | Schie et al. | 363/21.12 |
| 6,944,034 B1 | 9/2005 | Shytenberg et al. | |
| 6,956,750 B1 | 10/2005 | Eason et al. | |
| 6,958,920 B2 | 10/2005 | Mednik et al. | |
| 6,963,496 B2 | 11/2005 | Bimbaud | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,072,191 B2 | 7/2006 | Nakao et al. | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,099,163 B1 | 8/2006 | Ying | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,135,824 B2 | 11/2006 | Lys et al. | |
| 7,145,295 B1 | 12/2006 | Lee et al. | |
| 7,158,633 B1 | 1/2007 | Hein | |
| 7,161,816 B2 | 1/2007 | Shytenberg et al. | |
| 7,180,250 B1 | 2/2007 | Gannon | |
| 7,183,957 B1 | 2/2007 | Melanson | |
| 7,221,130 B2 | 5/2007 | Ribeiro et al. | |
| 7,233,135 B2 | 6/2007 | Noma et al. | |
| 7,255,457 B2 | 8/2007 | Ducharm et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,310,244 B2 | 12/2007 | Yang et al. | |
| 7,345,458 B2 | 3/2008 | Kanai et al. | |
| 7,388,764 B2 | 6/2008 | Huynh et al. | |
| 7,394,210 B2 | 7/2008 | Ashdown | |
| 7,538,499 B2 | 5/2009 | Ashdown | |
| 7,545,130 B2 | 6/2009 | Latham | |
| 7,554,473 B2 | 6/2009 | Melanson | |
| 7,569,996 B2 | 8/2009 | Holmes et al. | |
| 7,583,136 B2 | 9/2009 | Pelly | |
| 7,656,103 B2 | 2/2010 | Shteynberg et al. | |
| 7,667,986 B2 | 2/2010 | Artusi et al. | |
| 7,710,047 B2 | 5/2010 | Shteynberg et al. | |
| 7,719,246 B2 | 5/2010 | Melanson | |
| 7,719,248 B1 | 5/2010 | Melanson | |
| 7,746,043 B2 | 6/2010 | Melanson | |
| 7,746,671 B2 | 6/2010 | Radecker et al. | |
| 7,750,738 B2 | 7/2010 | Bach | |
| 7,756,896 B1 | 7/2010 | Feingold | |
| 7,777,563 B2 | 8/2010 | Midya et al. | |
| 7,804,256 B2 | 9/2010 | Melanson | |
| 7,804,480 B2 | 9/2010 | Jeon et al. | |
| 2002/0065583 A1 | 5/2002 | Okada | |
| 2002/0145041 A1 | 10/2002 | Muthu et al. | |

| | | |
|---|---|---|
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0018261 A1* | 1/2008 | Kastner .................. 315/192 |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0585789 A1 | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| WO | W09725836 | 7/1997 |
| WO | 01/97384 A | 12/2001 |
| WO | 0227944 | 4/2002 |
| WO | 02/091805 A2 | 11/2002 |
| WO | W02006005357 | 2/2006 |
| WO | WO 2006/022107 A2 | 3/2006 |
| WO | 2006/067521 A | 6/2006 |
| WO | W02006135584 | 12/2006 |
| WO | 2007/026170 A | 3/2007 |
| WO | 2007/079362 A | 7/2007 |
| WO | W02008072160 | 6/2008 |
| WO | W02008015238 | 12/2008 |

OTHER PUBLICATIONS

J. Zhou et al., Novel Sampling Algorithm for DSP Controlled 2 kW PFC Converter, IEEE Transactions on Power Electronics, vol. 16, No. 2, Mar. 2001.

A. Prodic, Compensator Design and Stability Assessment for Fast Voltage Loops of Power Factor Correction Rectifiers, IEEE Transactions on Power Electronics, vol. 22, No. 5, Sep. 2007.

M. Brkovic et al., "Automatic Current Shaper with Fast Output Regulation and Soft-Switching," S.15.C Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995, PESC apos: 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, ON Semiconductor, Publication Order No. AND184/D, Nov. 2004.

MEGAMAN, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3-7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al, International Rectifier, Bridgeless PFC Implementation Using One Cycle Control Technique, 2005.
Linear Technology, LT1248, Power Factor Controller, Apr. 20, 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.
ON Semiconductor, NCP1605, Enhanced, High Voltage and Efficient Standby Mode, Power Factor Controller, Feb. 2007.
ON Semconductor, NCP1606, Cost Effective Power Factor Controller, Mar. 2007.
ON Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6 Nov.-Dec. 2005.
F. T. Wakabayashi et al, An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.

M. K. Kazimierczuk et al., Electronic Ballast for Fluorescent Lamps, IEEE Transactions on Power Electronics, vol. 8, No. 4, Oct. 1993.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

H. L. Cheng et al., A Novel Single-Stage High-Power-Factor Electronic Ballast with Symmetrical Topology, IEEE Transactions on Power Electronics, vol. 50, No. 4, Aug. 2003.

J.W.F. Dorleijn et al., Standardisation of the Static Resistances of Fluorescent Lamp Cathodes and New Data for Preheating, Industry Applications Conference, vol. 1, Oct. 13-18, 2002.

Q. Li et al., An Analysis of the ZVS Two-Inductor Boost Converter under Variable Frequency Operation, IEEE Transactions on Power Electronics, vol. 22, No. 1, Jan. 2007.

H. Peng et al., Modeling of Quantization Effects in Digitally Controlled DC-DC Converters, IEEE Transactions on Power Electronics, vol. 22, No. 1, Jan. 2007.

G. Yao et al., Soft Switching Circuit for Interleaved Boost Converters, IEEE Transactions on Power Electronics, vol. 22, No. 1, Jan. 2007.

C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.

W. Zhang et al., A New Duty Cycle Control Strategy for Power Factor Correction and FPGA Implementation, IEEE Transactions on Power Electronics, vol. 21, No. 6, Nov. 2006.

H. Wu et al., Single Phase Three-Level Power Factor Correction Circuit with Passive Lossless Snubber, IEEE Transactions on Power Electronics, vol. 17, No. 2, Mar. 2006.

O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23-27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7-11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.

Fairchild Semiconductor, Application Note AN4121, Design of Power Factor Correction Circuit Using FAN7527B, Rev.1.0.1, May 30, 2002.

Fairchild Semiconductor, Application Note 6004, 500W Power-Factor-Corrected (PFC) Converter Design with FAN4810, Rev. 1.0.1, Oct. 31, 2003.

Fairchild Semiconductor, FAN4822, ZVA Average Current PFC Controller, Rev. 1.0.1 Aug. 10, 2001.

Fairchild Semiconductor, ML4821, Power Factor Controller, Rev. 1.0.2, Jun. 19, 2001.

Fairchild Semiconductor, ML4812, Power Factor Controller, Rev. 1.0.4, May 31, 2001.

Linear Technology, 100 Watt LED Driver, undated.

Fairchild Semiconductor, FAN7544, Simple Ballast Controller, Rev. 1.0.0.

Fairchild Semiconductor, FAN7532, Ballast Controller, Rev. 1.0.2.

Fairchild Semiconductor, FAN7711, Ballast Control IC, Rev. 1.0.2.

Fairchild Semiconductor, KA7541, Simple Ballast Controller, Rev. 1.0.3.

ST Microelectronics, L6574, CFL/TL Ballast Driver Preheat and Dimming, Sep. 2003.

ST Microelectronics, AN993, Application Note, Electronic Ballast with PFC Using L6574 and L6561, May 2004.

International Search Report and Written Opinion for PCT/US2008/062384 dated Jan. 14, 2008.

S. Dunlap et al., Design of Delta-Sigma Modulated Switching Power Supply, Circuits & Systems, Proceedings of the 1998 IEEE International Symposium, 1998.

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062387, dated Feb. 5, 2008.

International Search Report and Written Opinion, PCT US200900032358, dated Jan. 29, 2009.

Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.

International Search Report and Written Opinion, PCT US20090032351, dated Jan. 29, 2009.

Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Texas Instruments, SLUS828B, "8-Pin Continuous Conduction Mode (CCM) PFC Controller", UCC28019A, US, revised Apr. 2009.

Analog Devices, "120 kHz Bandwidth, Low Distortion, Isolation Amplifier", AD215, Norwood, MA, 1996.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

International Search Report and Written Report PCT US20080062428 dated Feb. 5, 2008.

Prodic, A. et al, "Dead Zone Digital Controller for Improved Dynamic Response of Power Factor Preregulators," IEEE, 2003.

"HV9931 Unity Power Factor LED Lamp Driver, Initial Release", Supertex Inc., Sunnyvale, CA USA 2005.

AN-H52 Application Note: "HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conferrence, 2007. PESC 2007. IEEE, IEEE, P1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search Report PCT/US2008/062387 dated Feb. 5, 2008.
Noon, Jim "UC3855A/B High Performance Power Factor Preregulator", Texas Instruments, SLUA146A, May 1996, Revised Apr. 2004.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt://focus.ti.com/lit/ml/slup169/slup169.pdf the whole document.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.

* cited by examiner

SWITCHING POWER CONVERTER AND CONTROL SYSTEM

CROSS-REFERENCE TO RELATED APPLICATION

This application also claims the benefit under 35 U.S.C. §119(e) and 37 C.F.R. §1.78 of U.S. Provisional Application No. 60/894,295, filed Mar. 12, 2007 and entitled "Lighting Fixture". U.S. Provisional Application No. 60/894,295 includes exemplary systems and methods and is incorporated by reference in its entirety.

This application claims the benefit under 35 U.S.C. §119(e) and 37 C.F.R. §1.78 of U.S. Provisional Application No. 60/915,547, filed May 2, 2007, and entitled "Power Factor Correction (PFC) Controller Apparatuses and Methods," and is incorporated by reference in its entirety.

BACKGROUND OF THE INVENTION

1. Field of the Invention

The present invention relates in general to the field of electronics, and more specifically to a switching power converter and control system.

2. Description of the Related Art

Power converters convert one source of input power into another source of power. For example, power converters convert alternating current (AC) voltage into direct current (DC) voltage or a first DC voltage into a second DC voltage. To maintain efficiency and meet international standards, power converters often incorporate power factor correction that minimizes phase and harmonic differences between input voltage and input current.

A large number and variety of applications utilize switching power converters to provide output power from a variety of input power sources. For example, high efficiency light sources, such as high frequency inverters for gas discharge lights (e.g. fluorescent lights) and light emitting diodes (LEDs), are powered utilizing DC voltages. However, power companies typically provide AC line voltages. Thus, one particular use of power converters is to convert AC line voltages into compatible, power factor corrected DC output voltages to provide power for high efficiency light sources.

Quadratic power converters for providing low voltage outputs from a wide range of input voltages were proposed by D. Maksimovic and S. Cuk in the article entitled "Switching Converter with Wide DC Conversion Range", May 1989 Proceedings of the HFPC and also in the article entitled "Switching Converters with Wide DC Conversion Range" published in the Institute of Electrical and Electronic Engineer's (IEEE) Transactions on Power Electronics, January 1991. The topologies use a single switch to control cascaded buck and buck-boost stages. However, power factor correction generally cannot be provided using these topologies. In order to provide good power factor performance, an input stage receives an AC voltage and stores energy in a storage capacitor during half of each AC cycle. The storage capacitor provides energy for the other half of the cycle. A modified structure is needed for this performance to be possible.

FIG. 1a depicts a single switch power converter described in U.S. Pat. No. 6,781,351, entitled "AC/DC Cascaded Power Converters Having High DC Conversion Ratio and Improved AC Line Harmonics", inventors Mednik et al., and filed on Oct. 28, 2002 (referred to herein as "Mednik"). The power converter described in Mednik can be used to convert AC line voltages into DC output voltages to power, for example, LEDs. Mednik describes a power supply 100 that combines an AC rectifier 102 with a first converter stage 104. An inductor L1 is connected in series with a blocking diode D1 to an input node 106 that receives a positive DC input voltage with respect to a common node 103. The voltage input signal $V_x$ is a rectified AC voltage.

When switch Q1 is activated, inductor L1 is energized by causing switch Q1 to conduct and draw current from the input node 106 by alternately connecting switching input node 106 to common node 103. Blocking diode D1 prevents reverse flow of current to input node 106 when the voltage at input node 106 falls below the voltage at switching node 108, permitting only unidirectional current flow through inductor L1. Inductor L1 is energized from a zero current to a peak current proportional to the product of the on-state period of switch Q1 and the instantaneous voltage present at node 106. Simultaneously, capacitor C1 delivers stored energy to DC/DC converter stage 110. The DC/DC converter stage 110 provides constant voltage power to resistive load R_LOAD.

When switch Q1 is deactivated, current flows through a flyback diode D2 and blocking diode D1, causing the energy stored in inductor L1 to transfer to capacitor C1. Blocking diode D1 prevents reverse flow of current when the voltage at node 108 exceeds the instantaneous voltage at node 106, as a reverse current would otherwise occur once the inductor L1 current has reached zero. Diode D1 enables first power converter stage 104 to maintain a DC voltage at capacitor C1, while enforcing discontinuous inductor current mode in inductor L1. Capacitor C1 is selected to be sufficiently large in order to maintain a substantially DC voltage $V_{C1}$ during operation of power supply 100.

Assuming that the duty ratio of switch Q1 is kept constant, an average input current into node 104 will be proportional to the instantaneous voltage at node 104, and power factor correction is achieved. Thus, inductor L1 draws input current only when switch Q1 conducts. The converter in Mednik achieves power factor correction by maintaining a constant relationship between the input voltage at node 106 and the current drawn through node 106 by inductor L1. However, the flyback diode D2 prevents input current from charging capacitor C1 when switch Q1 is non-conductive. Thus, the voltage of capacitor C1 never exceeds the peak input voltage at node 106. However, by preventing input current from charging capacitor C1 when switch Q1 is non-conductive, the control of switch Q1 is very simple. In exchange for simple control, the power supply 100 utilizes a relatively low voltage stored on capacitor C1. Storing a low voltage on capacitor C1 requires a relatively larger capacitor so that sufficient energy is stored by capacitor C1. Additionally, current is drawn from the input only during the 'on' time of the switch Q1, increasing the root mean square (RMS) current in the switch Q1, and requiring additional diodes, as shown in FIG. 4 of Mednik.

Switch state controller 112 controls the activation and deactivation, i.e. the conductivity, of switch Q1. U.S. Pat. No. 6,940,733, entitled "Optimal Control of Wide Conversion Ratio Switching Converters", inventors Schie et al., and filed on Aug. 22, 2003 (referred to herein as "Schie") describes an exemplary switch state controller 112. The switch state controller of Schie is used for producing a pulse train. The switch state controller 112 is coupled to either an input or internal node 106 of power supply circuit 100 to receive feedback signal FB1, i.e. the voltage $V_{C1}$ across capacitor C1, for controlling the on-time (i.e. the pulse width) of each pulse in the pulse train. A frequency of the pulse train is controlled by a feedback signal FB2 coupled from an output characteristic of the power supply circuit 100.

FIG. 1b depicts a switching power converter 150 with load voltage monitoring as described in an article "Automatic Current Shaper with Fast Output Regulation and Soft-Switching" by Milivoje Brkovic and Slobodan Cuk, Telecommunications Energy Conference, 1993. INTELEC '93. 15th International, Sep. 27-30, 1993, Vol. 1, pages 379-386, ISBN: 0-7803-1842-0 (referred to herein as the "Brkovic Article"). The switching power converter 150 converts an input, time-varying voltage $V_{in}$ into a DC load voltage $V_L$. The switching power converter 150 includes a switch Q1 that responds to a pulse width modulated control signal $C_S$ to alternately connect and disconnect inductor 154 and capacitor 156 to a common reference voltage $-V_{in}$. The switching power converter 150 energizes inductor 154 when switch Q1 conducts. When switch Q1 is non-conductive, inductor 154 provides stored current to capacitor 156. Switching power converter 150 operates in discontinuous inductor current mode, so inductor 154 is completely discharged prior to switch Q1 becoming conductive. Diode 152 prevents reverse current flow into the $+V_{in}$ terminal Capacitor 156 and inductor 158 provide a constant load current $i_{load}$ to load 160. Diode 164 prevents reverse current flow into inductor 158. Inductor 154, capacitor 156, and inductor 158 have respective values of L1, C1, and L2.

The switching power converter 150 includes a switch control circuit 162 to control the switching frequency of switch Q1. Switch control circuit 162 monitors the load voltage $V_L$ with respect to a reference voltage $V_{ref}$. The switch control circuit 162 modulates the frequency of control signal $C_S$ in response to changes in the load voltage $V_L$. The Brkovic Article indicates that the switching power converter 150 requires a modulation index (MI) of greater than 2 to obtain a total harmonic distortion of less than 13%. The MI is defined by the Brkovic Article as the capacitor voltage $V_C$ divided by the peak input voltage $V_{in\_peak}$, i.e. $V_C/V_{in-peak}$. When the switching power converter 150 is operated in discontinuous inductor current mode and at a constant duty cycle ratio of control signal CS, the switching power converter 150 is designed so that the input current $i_{in}$ becomes automatically proportional to the line voltage $V_{in}$ to achieve power factor correction.

SUMMARY OF THE INVENTION

In one embodiment of the present invention, an apparatus includes a switching power converter. The switching power converter includes an input stage. The input stage includes an input node to receive a time-varying input signal and a first inductor coupled to the input node. The switching power converter also includes an output stage coupled to the input stage. The output stage includes a capacitor and a second inductor coupled to the capacitor. the switching power converter also includes a switch, coupled to the input stage and the output stage, to control energy transfer to the capacitor. The apparatus also includes a switch state controller, coupled to the switch, to monitor the time-varying input signal and to supply a switching power converter control signal to the switch to modulate a switching frequency of the switch in accordance with amplitude changes of the input signal. The switching frequency of the switch is greater than a frequency of the input signal.

In another embodiment of the present invention, a method includes generating a pulse width modulated switching power converter control signal and monitoring a time-varying input signal to the switching power converter. The method also includes monitoring a boost capacitor voltage of the switching power converter and supplying a switching power converter control signal to modulate a frequency of the control signal in accordance with amplitude changes of the input signal, wherein the frequency of the control signal is greater than a frequency of the input signal.

In a further embodiment of the present invention, a lighting system includes a switching power converter comprising a power factor correction stage, a driver stage having a capacitor to receive energy from the power factor correction stage, a switch coupled to the power factor correction and driver stages, and an input to receive a time-varying input signal. The lighting system further includes a switch state controller, coupled to the switch, to generate a frequency and duty cycle modulated switch control signal to control conductivity of the switch. During operation of the switch state controller the switch state controller modulates a switching frequency of the switch in accordance with amplitude changes of the input signal. The switching frequency of the switch is greater than a frequency of the input signal, and the switch state controller controls a duty cycle of the control signal to control an output voltage of the switch state controller. The lighting system further includes a light source coupled to the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1A:
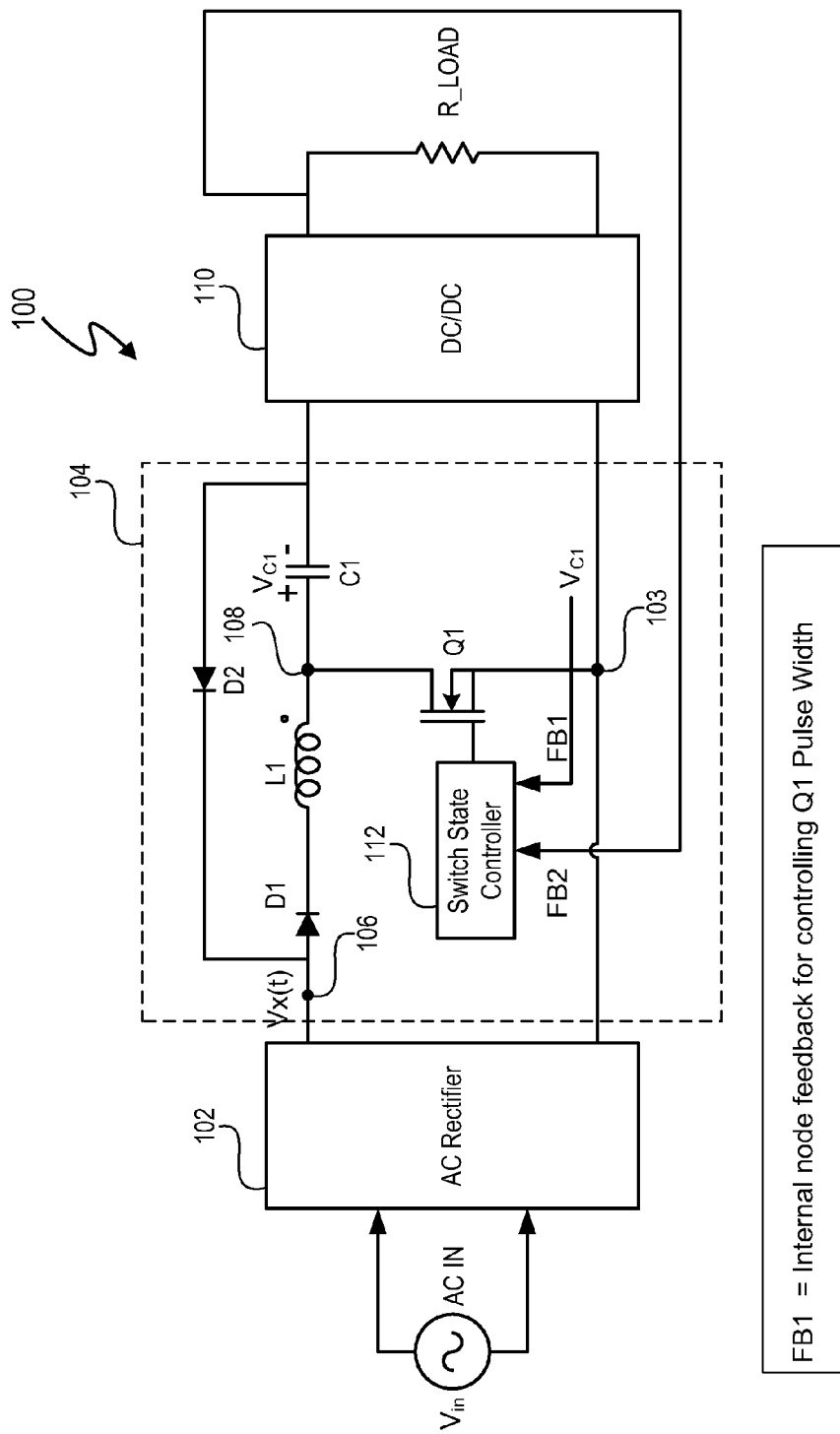
FIG. 1a (labeled prior art) depicts a single switch power converter.
Figure 1B:
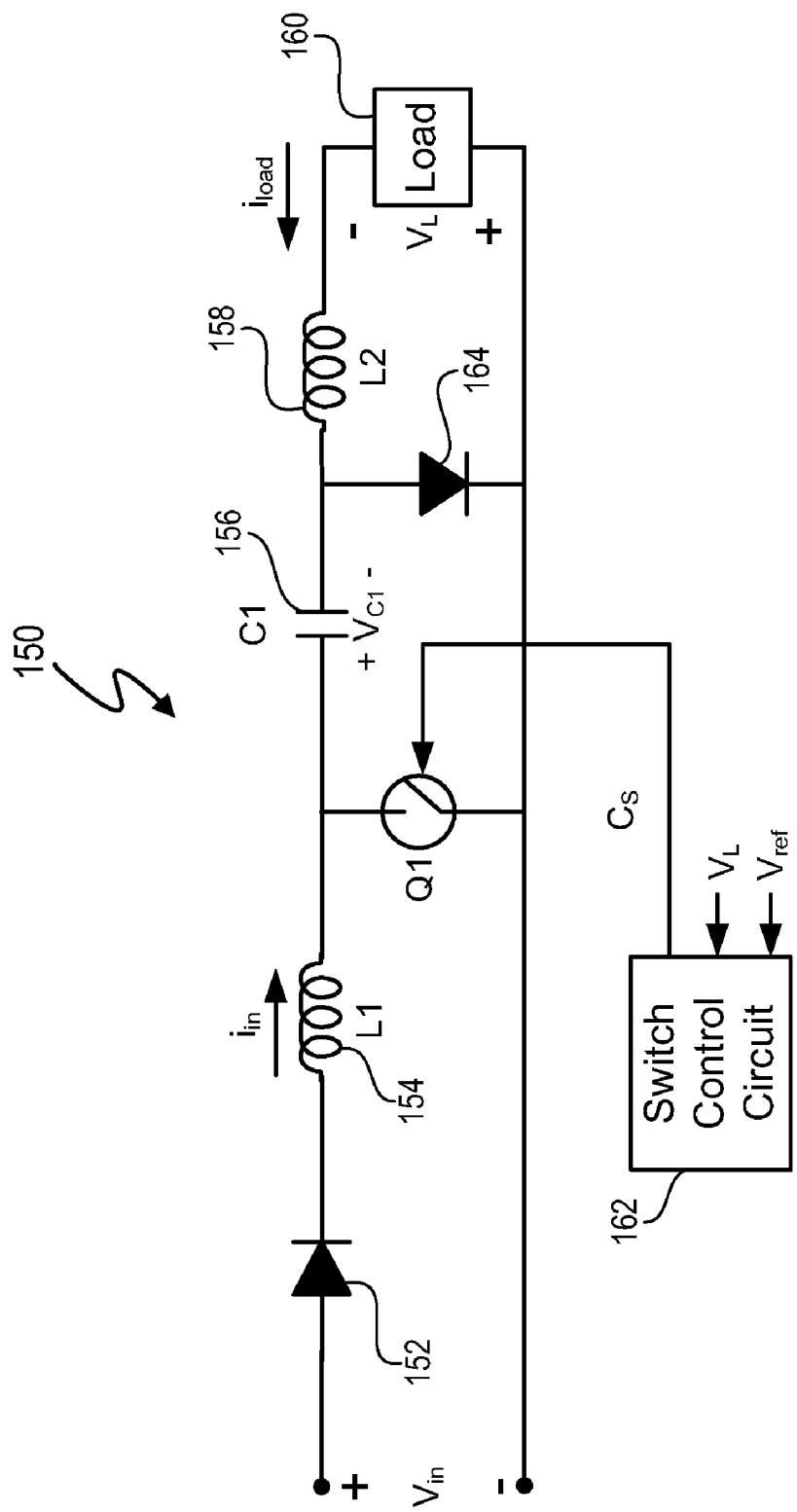
FIG. 1b (labeled prior art) depicts switching power converter with load voltage monitoring.

A switching power converter tracks a time-varying input voltage during each cycle of the input voltage to provide power factor correction. The switching power converter includes a switch with a frequency and duty cycle modulated control signal. The switch controls the transfer of energy between the input and output of the switching power converter. The frequency of the control signal is greater than a frequency of the input signal. The control signal frequency is modulated during each cycle of the input voltage so that energy transferred from the switching power converter tracks the energy supplied to the switching power converter. In at least one embodiment, the switching power converter has no theoretical limits to driving total harmonic distortion (THD) to 0 and obtaining a power factor correction (PFC) of one for a modulation index (MI) greater than one. Circuit component imperfections and other actual non-idealities prevent switching power converter from actually achieving 0 THD and PFC=1. Thus, theoretical limits on the THD and PFC are not design obstacles for the switching power converter for MI>1.

In at least one embodiment, a switch state controller of the switching power converter controls one or more internal switches of a switching power converter to control the output power of the switching power converter and to control power factor correction. The switch state controller utilizes feedback from an output characteristic of the switching power converter to control duty cycles of a pulse width modulated control signal and utilizes feedback from internal nodes of the switching power converter to control a frequency of the control signal. The switch state controller supplies a control signal to each internal switch of the switching power converter to control the conductivity of each switch. The switching power converter controls the output voltage, the output current, or both of the switching power converter and controls power factor correction by varying the duty cycle and/or the frequency of the pulse width modulated control signal.

In at least one embodiment, the switching power converter also charges a boost capacitor to a voltage that exceeds a peak input voltage. The boost capacitor provides a stable output voltage to a load. In at least one embodiment, the switching power converter includes a switch, and when the switch conducts, an input stage inductor energizes by drawing input current from an input power source. When the switch is non-conductive, the inductor transfers charge to the boost capacitor and continues to draw input current from the input power source. By continuing to draw input current while the switch is non-conductive, in at least one embodiment, the inductor charges the boost capacitor to a voltage that exceeds a peak voltage of the input power source. Increasing the voltage of the boost capacitor allows the capacitor to be smaller relative to a conventional power converter that provides the same output voltage, and a higher boost capacitor voltage improves operating efficiency of the switching power converter.

Because input current is drawn during times when the switch is conductive and non-conductive, more complicated algorithms, relative to conventional switch-state control algorithms, are used to control the duty cycle and frequency of the switch. In at least one embodiment, a switch state controller processes feedback from the switching power converter in accordance with the algorithms to modulate the frequency and pulse widths of a pulse width modulated switch control signal to provide power factor correction and control the output voltage and output current of the switching power converter. In at least one embodiment of the switch state controller, an output characteristic, such as output current, of the power converter is used to control the duty cycle of the switch control signal, and voltage at a node of the boost capacitor and the input voltage are used to control the frequency of the switch control frequency.

Figure 2A:
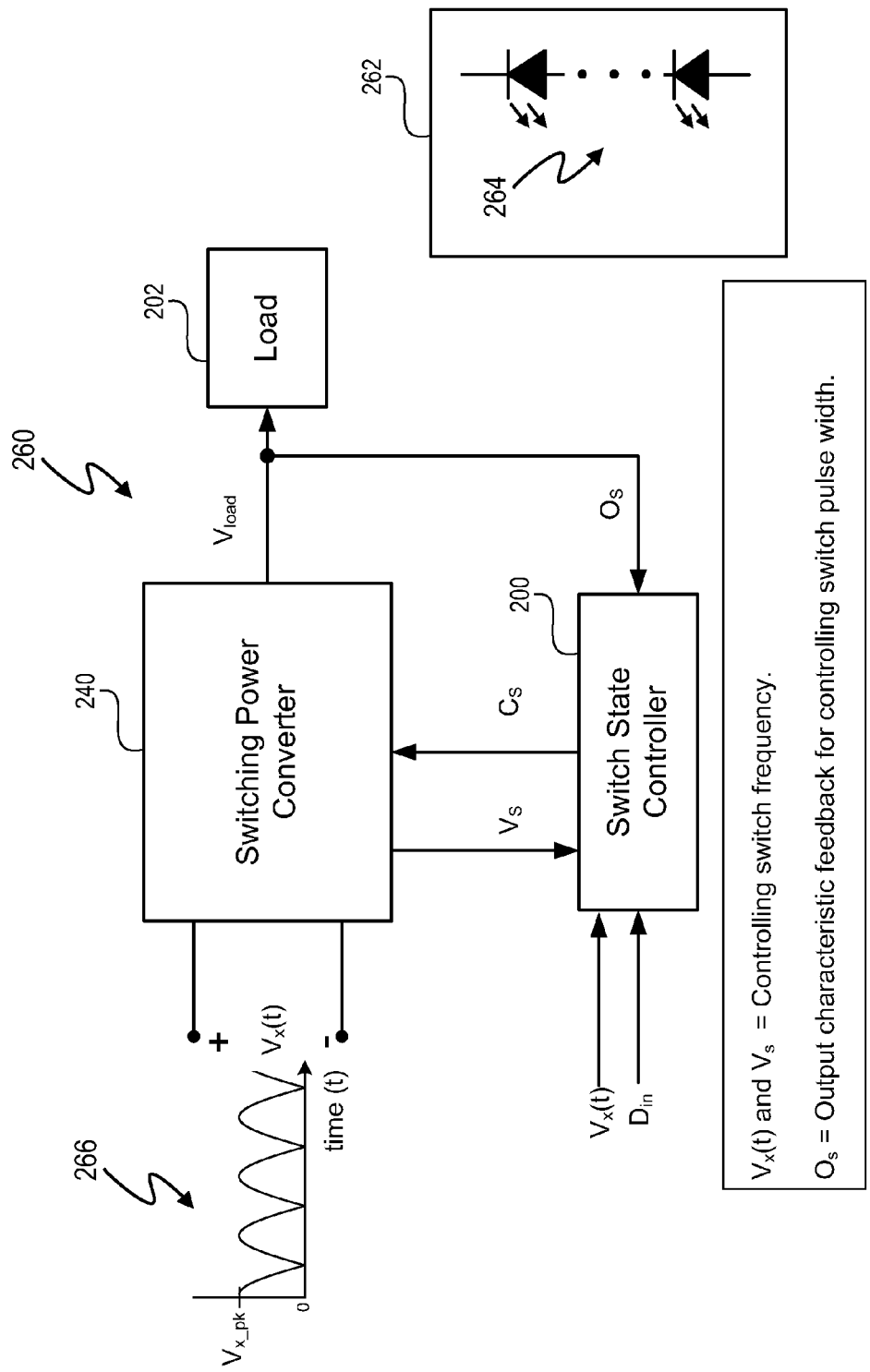
FIG. 2a depicts a switch state controller and a switching power converter.

FIG. 2a depicts a power system 260 that includes a switch state controller 200 to control a switching power converter 240. The switch state controller 200 utilizes feedback signal $O_S$ from an output characteristic of the switching power converter 240 to control duty cycles of a pulse width modulated control signal $C_S$ and utilizes the input voltage $V_x$ and a feedback signal Vs from an input characteristic of the switching power converter to control a frequency of the control signal $C_S$. The switch state controller 200 supplies the control signal $C_S$ to at least one internal switch of the switching power converter 240 to control the conductivity of each switch. The switching power converter 240 controls the output voltage $V_{load}$, the output current $i_{load}$, or both and controls power factor correction by varying the duty cycle and/or the frequency of the pulse width modulated control signal $C_S$. The switching power converter 240 provides power to load 202. Load 202 can be any load such as a light source 262 having one or more LEDs 264. Other exemplary light sources are gas discharge lights (such as fluorescent lights), and a combination of one or more LEDs and gas discharge lights. Load 202 can also represent multiple loads, such as multiple light sources. In at least one embodiment, the switch state controller 200 receives an input signal $D_{in}$ and controls the switch state controller 200 in response to the input signal $D_{in}$. The input signal $D_{in}$ is, for example, an ON/OFF signal, which indicates whether or not to supply power to load 202, and/or a dimming input signal that indicates how much power to supply to load 202.

Figure 2B:
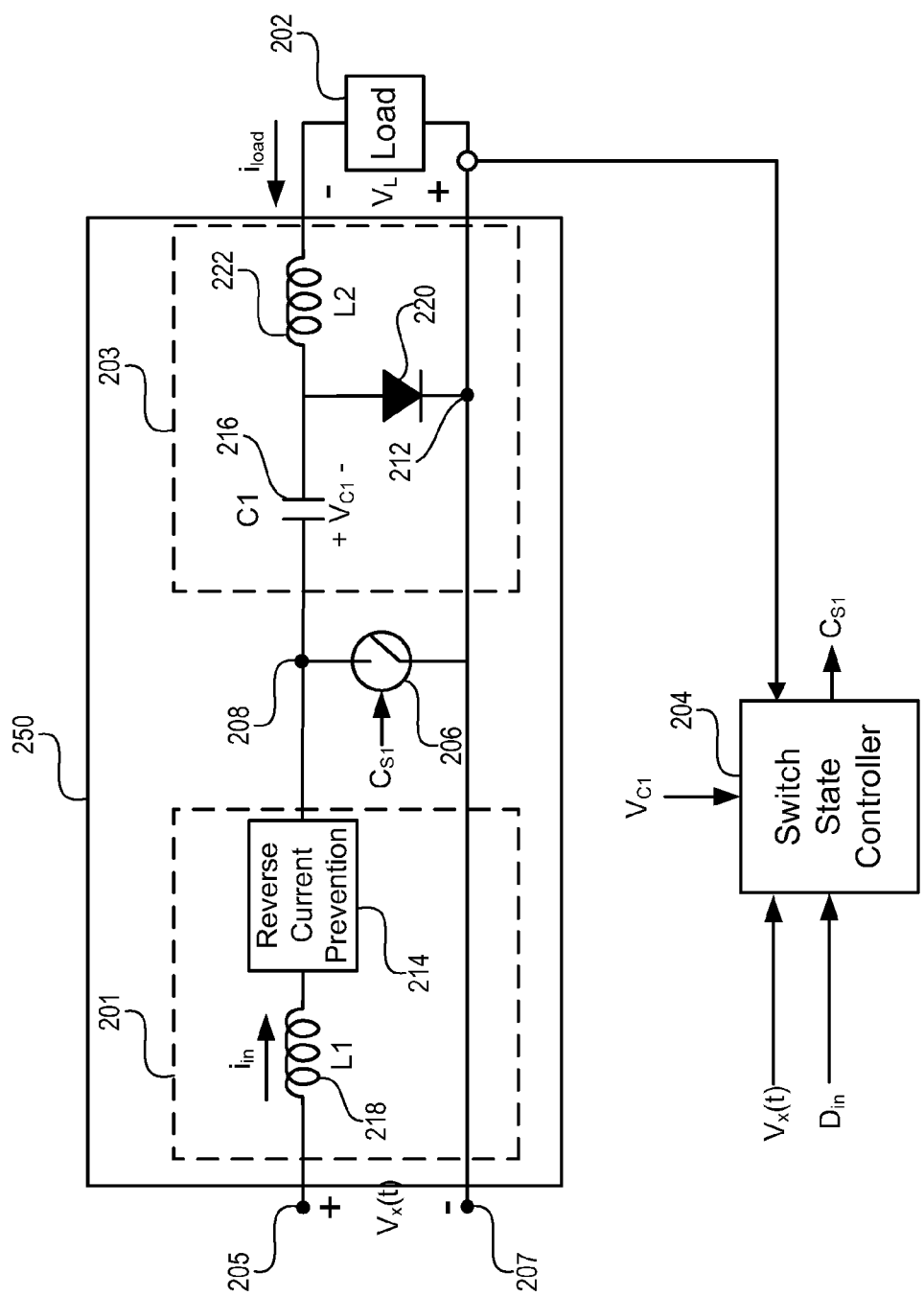
FIG. 2b depicts another switch state controller and a switching power converter.
Figure 5:
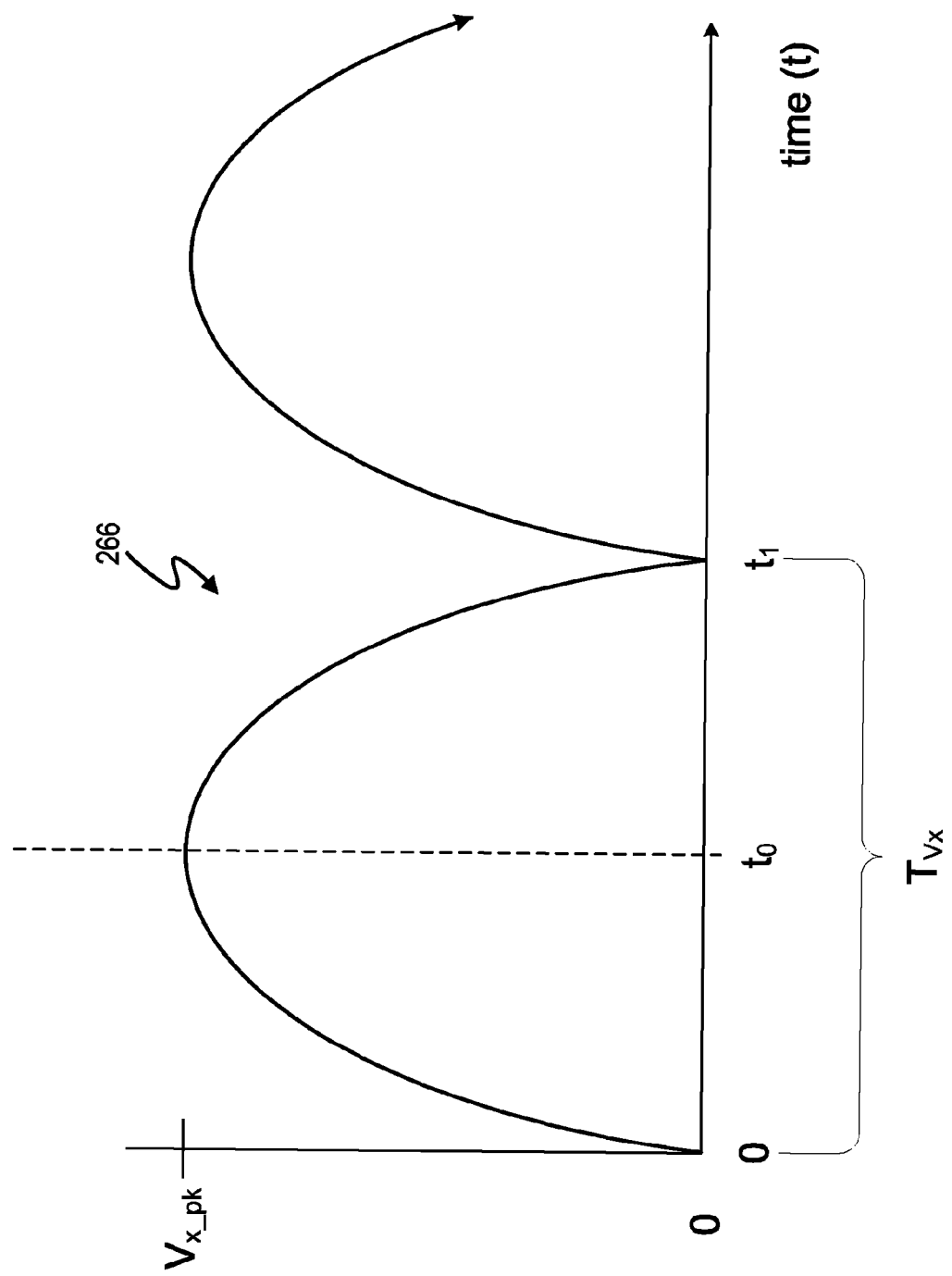
FIG. 5 depicts a time varying input voltage wave form.

Referring to FIGS. 2b and 5, the input voltage $V_x$ is time-varying, and, in at least one embodiment, is a rectified sine wave 266. During each cycle of input voltage $V_x(t)$ (e.g. each half sine wave in voltage wave form 266), the amplitude of the input voltage $V_x(t)$ varies from 0 V to a peak voltage $V_{x\_pk}$ and back to 0 V. As the input voltage $V_x(t)$ increases during the first half of each cycle, i.e. between time 0 and time $t_0$ and $t_0-0=T_{Vx}/2$, the amount of energy transferred to the switching power converter 240 increases until the input voltage $V_x(t)$ reaches the peak voltage $V_{x\_pk}$, where peak energy transfer occurs. As the input voltage $V_x(t)$ decreases during the second half of each cycle, i.e. between time $t_0$ and $t_1$ and $t_1-t_0=T_{Vx}/2$, the amount of energy transferred to the switching power converter 240 decreases. The conventional switching power converter described in the Brkovic Article achieves lower total harmonic distortion (THD) by increasing the modulation index (MI) of the conventional switching power converter. The switch state controller 200 compensates for the varying energy transfer by modulating the frequency of control signal $C_S$ in direct relationship to the time-varying amplitude of the input voltage. Thus, in at least one embodiment, the switch state controller 200 can use a smaller boost capacitor 216 and a lower MI to achieve low THD, relative to the switching power converter described in the Brkovic Article. The value of capacitor 216 is a matter of design choice and is preferably selected to be sufficiently large in order to maintain a substantially DC voltage $V_{C1}$ during operation of switching power converter 250.

In at least one embodiment, the switching power converter 250 has no theoretical limits to driving total harmonic distortion (THD) to 0 and obtaining a power factor correction (PFC) of one for a modulation index (MI) greater than one. Circuit component imperfections and other actual non-idealities prevent switching power converter from actually achieving 0 THD and PFC=1. Thus, theoretical limits on the THD and PFC are not design obstacles for the switching power converter for MI>1. In at least one embodiment, the input voltage $V_x(t)$ can be implemented as other waveforms besides a rectified sine wave.

The peak voltage approximately equals the peak root means square (RMS) voltage times 1.414. For example, in the United States of America, the peak voltage $V_{x\_pk}$ is approximately 165 V, and, in Europe, the peak voltage is approximately 325 V.

FIG. 2b depicts an exemplary switch state controller 204 that controls a switching power converter 250. In at least one embodiment, switch state controller 204 represents one embodiment of switch state controller 200, and switching power converter 250 represents one embodiment of switching power converter 240. Switching power converter 250 provides power to load 202.

Switching power converter 250 includes an input stage 201 and a driver stage 203. Switch 206 is connected to shunt node 208 to the negative node 207 when conducting. Thus, switch 206 controls the load voltage $V_L$ and output current $i_{load}$ provided by the driver stage 203. Switching power converter 250 also includes a reverse current prevention circuit 214 to prevent current from flowing into the input node 205. In at least one embodiment, the reverse current prevention circuit 214 is a diode with an anode connected to the inductor 218 and a cathode connected to switching node 208. In other embodiments, the reverse current prevention circuit 214 is any device that prevents reverse current flow, such as a switch having conductivity that is controlled to prevent reverse current flow.

Switch state controller 204 generates a pulse width and frequency modulated control signal $C_{S1}$. In at least one embodiment, control signal $C_{S1}$ represents one embodiment of control signal $C_S$. The control signal $C_{S1}$ is a pulse width modulated signal, and switch state controller 204 controls the duty cycle of each pulse and the frequency of the control signal. In one embodiment, switch 206 is an n-channel FET with a gate acting as a control node to receive the control signal $C_{S1}$. Thus, the switch 206 conducts when control signal $C_{S1}$ is "high" and is non-conductive when control signal $C_{S1}$ is "low".

In at least one embodiment, switching power converter 250 provides power to load 202 by boosting the voltage $V_{C1}$ across boost capacitor 216 to a value greater than a peak input voltage $V_{x\_pk}$. Equation [1] represents the energy E stored by capacitor 216 as a function of capacitor voltage $V_{C1}$ and capacitor 216:

$$E = \frac{1}{2} \cdot C1 \cdot V_{C1}^2. \qquad [1]$$

C1 represents the capacitance of capacitor 216.

Because the energy stored by capacitor 216 is a non-linear function of the capacitor voltage $V_{C1}$, storing higher voltages across capacitor 216 allows capacitor 216 to provide the same amount of energy as a larger capacitor having a lower capacitor voltage. Additionally, higher voltages typically allow circuits including load 202 to function more efficiently.

In another embodiment, the switching power converter 250 boosts the voltage of $V_{C1}$ to a value very close to the peak input voltage $V_{x\_pk}$ to obtain a MI of approximately 1, e.g. 1.1, where $MI=(V_{C1}/V_{x\_pk})$ and achieve a theoretical THD of zero. In at least one embodiment, the actual THD is affected by circuit imperfections of switching power converter 250 but not by theoretical limitations. A lower MI means that a smaller, generally less expensive, boost capacitor 216 and a smaller transistor for implementing switch 206 can be used while obtaining low THD.

Figure 3:
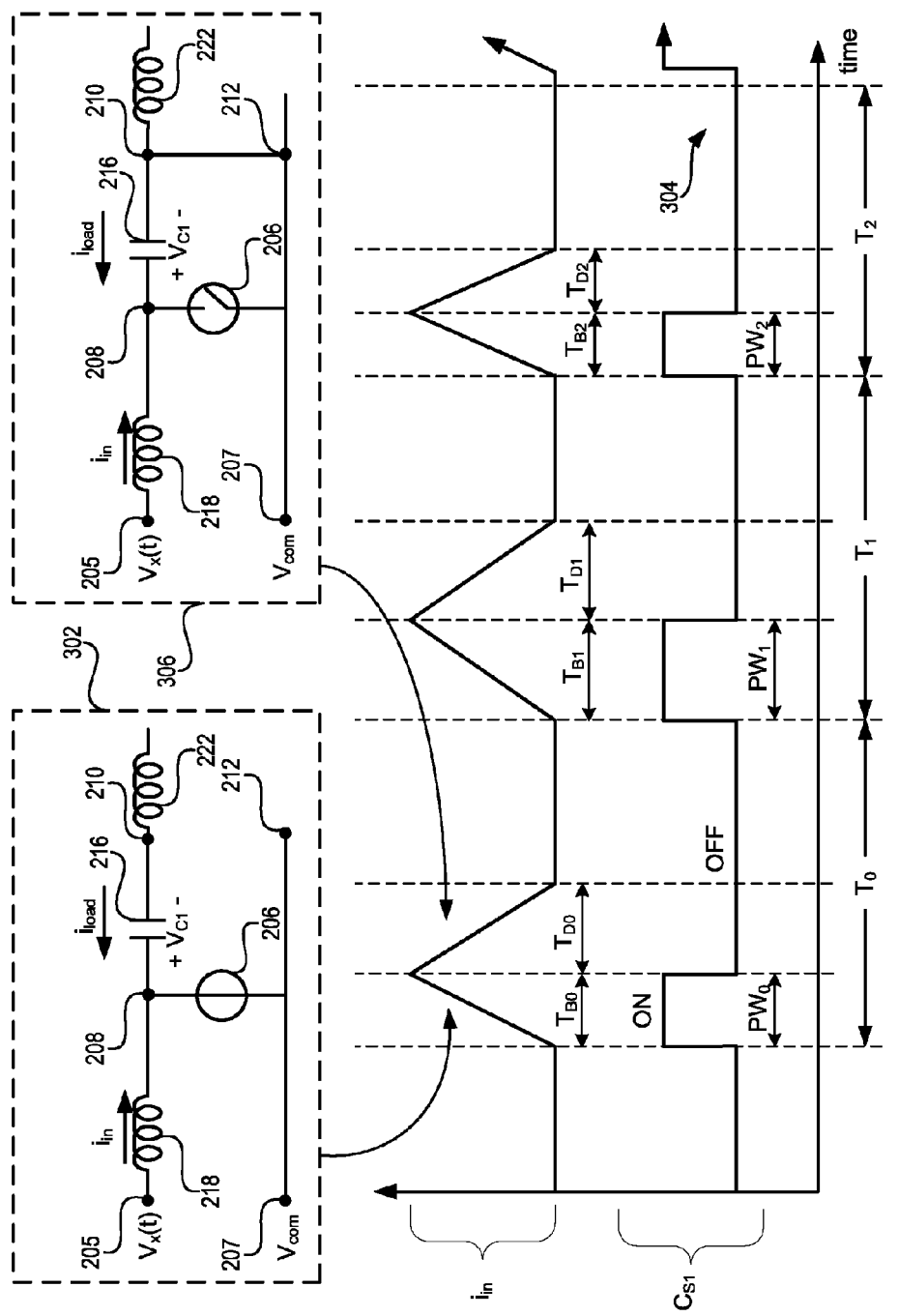
FIG. 3 depicts corresponding equivalent circuit portions of the power converter of FIG. 2b and graphs of a corresponding input current and a switch control signal over time.

FIG. 3 depicts circuit portions of power converter 250 during conductive and non-conductive states of switch 206. The capacitor voltage $V_{C1}$ can be controlled by the frequency of control signal $C_{S1}$, and the load current $i_{load}$ can be controlled by controlling the pulse width of control signal $C_{S1}$. Referring to FIGS. 2b and 3, circuit 302 represents the equivalent circuit between the input nodes 205 and 207 and output nodes 210 and 212 of switching power converter 250 when control signal $C_{S1}$ is high. In the embodiment of FIG. 3, reverse current prevention circuit 214 and diode 220 may have small voltage drops when conducting but are represented as short circuits in FIG. 3 when conducting for clarity. Referring to circuit 302, when control signal $C_{S1}$ is high, switch 206 is activated and conducts, and switch node 208 is pulled low to common voltage $V_{com}$. Diode 220 is reversed biased and is represented by an open circuit between nodes 210 and 212. Diode 220 can be replaced by a reverse current prevention circuit that conducts when switch 206 is non-conductive. Input current $i_{in}$ builds for time period $T_B$ and energizes inductor 218. The build time period $T_B$ for each period of control signal $C_{S1}$ equals the duration of pulse width PW for each period in the pulse train 304 of control signal $C_{S1}$. For example, during period $T_0$, build time period $T_{B0}$ equals the duration of pulse width $PW_0$, during period $T_1$, time period $T_B$ equals the duration of $PW_1$, and so on. When switch 206 is conductive, the polarity of node 210 is negative with respect to common voltage $V_{com}$. When control signal $C_{S1}$ is high, the capacitor voltage $V_{C1}$ provides current to energize inductor 222 so that current is continuously provided to load 202.

Circuit 306 represents the equivalent circuit between the input voltage nodes 205 and 207 and output nodes 210 and 212 of switching power converter 250 when control signal $C_{S1}$ is low. When control signal $C_{S1}$ is low, switch 206 is deactivated and becomes non-conductive. An inductor current from inductor 218 decays for a decay time period $T_D$, de-energizes inductor 218, and transfers charge to capacitor 216. At the end of decay time period $T_D$, the stored energy in inductor 218 has completely decayed. In at least one embodiment, circuit 306 operates in discontinuous inductor current mode, so the switch 206 remains open after decay time period $T_D$ until the next pulse of control signal $C_{S1}$. The decay time period $T_D$ represents the discharge time of inductor 219 for each period of control signal $C_{S1}$. For example, during period $T_0$, decay time period $T_{D0}$ represents $T_0$-$T_{B0}$, during period $T_0$, decay time period $T_{D1}$ represents period $T_1$-$T_{B1}$, and so on. Diode 220 is forward biased, and inductor 222 transfers energy to load 202. Switching power converter 250 does not include a flyback diode, such as diode D2 (FIG. 1a), and, thus, circuit 306 continues to draw input current $i_{in}$ while switch is 206 is non-conductive. Accordingly, the capacitor voltage $V_{C1}$ is greater than the peak voltage, $V_{x\_pk}$, of the time-varying input signal $V_x$. Increasing the capacitor voltage $V_{C1}$ allows the capacitor 216 to be smaller relative to a conventional power converter that provides the same output voltage. A higher capacitor voltage $V_{C1}$ improves operating efficiency of the switching power converter 250. Additionally, the current in the switch is reduced, allowing higher efficiency, and lower cost switch component costs.

In at least one embodiment, the switch state controller 204 controls and varies the frequency and duty cycle of control signal $C_{S1}$ to maintain a power factor of approximately 1 during steady state operation of switching power converter 250. In at least one embodiment, a power factor of approximately 1 is any value from 0.9 up to and including 1.0. Switch state controller 204 can be implemented using, for example, integrated circuit based logic, discrete logic components, software, and/or firmware. The switch state controller includes logic to process algorithms that control the frequency and duty cycle of control signal $C_{S1}$. Because input current is drawn by capacitor 216 during the time switch 206 is non-conductive, the algorithms are more complex than switching algorithms utilized by power converter controllers in Mednik and Schie. Equation [2] depicts the relationship between the inductor 218 current $i_{in}$ decay time period $T_D$, the inductor 218 current $i_{in}$ build time period $T_B$, the input signal $V_x$, and the capacitor voltage $V_{C1}$:

$$T_D = \frac{T_B \cdot V_x}{V_{C1} - V_x}. \qquad [2]$$

Equation [3] represents the peak input current $i_{in}$ in terms of the build time period $T_B$, the input signal $V_x$, and inductor 218:

$$i_{in\_peak} = T_B \cdot L1 \cdot V_x \qquad [3].$$

L1 represents the inductance value of inductor 218. In discontinuous current mode, Equation [4] represents the inductor 218 current $i_{in}$:

$$i_{in} = \frac{1}{2} \cdot i_{in\_peak} \cdot \left(\frac{T_B + T_D}{T}\right) = \frac{1}{2} \cdot V_x \cdot L1 \cdot \frac{T_B^2}{T} \cdot \left(\frac{V_{C1}}{V_{C1} - V_x}\right). \quad [4]$$

During steady state operation, Equation [4] can be reduced to:

$$i_{in} \approx R \cdot V_x \quad [5].$$

Since the input current $i_{in}$ and input voltage are related by a constant, R, Equation [5] indicates an achieved power factor of approximately 1 during steady state operation.

The capacitor voltage $V_{C1}$ and the load voltage $V_L$ across the load 202 are related by the duty cycle ($T_B/T$) of control signal $C_{S1}$ in accordance with Equation [6]:

$$\frac{T_B}{T} = \frac{V_L}{V_L + C1}. \quad [6]$$

"T" is the period of the control signal $C_{S1}$. $T=1/f_{CS1}$. "$f_{CS1}$" is the frequency of control signal $C_{S1}$, which also represents the switching frequency of switch 206. In at least one embodiment, the frequency $f_{CS1}$ of control signal $C_{S1}$ is between 20 kHz and 150 kHz to avoid audio frequencies and to maintain the efficiency of switch 206.

The switch state controller 204 also monitors the input voltage $V_x$, either directly or, for example, through a scaling resistor. The switch state controller 204 tracks the input voltage $V_x$ and the capacitor voltage $V_{C1}$ and modulates the frequency $f_{CS1}$ to adjust the energy transferred to boost capacitor 216 as the energy provided to switching power converter 250 changes over time. Frequency $f_{Vx}$ of input voltage $V_x(t)$ is generally between 50 Hz and 60 Hz. In at least one embodiment, the switch state controller 204 determines the frequency $f_{CS1}$ at a rate that exceeds the value of frequency $f_{Vx}$. Thus, the switch state controller 250 updates the switching frequency $f_{CS1}$ at least ($f_{CS1}/f_{Vx}$) times greater than the input voltage $V_x(t)$ frequency $f_{Vx}$. For example, for $f_{CS1}$=100 kHz and $f_{Vx}$=60 Hz, switch state controller 150 updates the switching frequency $f_{CS1}$ at least 1,667 times during each cycle of input voltage $V_x(t)$.

In at least one embodiment, switch state controller 204 determines the period T, and, thus, the control signal $C_{S1}$ frequency $f_{CS1}$, in accordance with Equation [7]:

$$T = K \cdot P \cdot \left(1 - \frac{V_x}{V_{C1}}\right). \quad [7]$$

"K" is a constant determined in accordance with Equation [8]:

$$K = \frac{PWR}{(V_{xrms})^2} \cdot 2 \cdot L \quad [8]$$

PWR is the maximum power deliverable by switching power converter 250 for a given input voltage $V_x(t)$. $V_{x\,rms}$ is the root mean square of input voltage $V_x$, and L is the inductance value of inductor 218. "P" is a scaled power ratio equal to the desired power to be provided by switching power converter 250 divided by the maximum power deliverable by switching power converter 250 for a given input voltage $V_x(t)$.

From Equation [7], as the input voltage $V_x(t)$ increases, switch state controller 204 decreases the period T and, thus, increases the control signal frequency $f_{CS1}$. More energy is transferred as $V_x(t)$ increases and increasing the control signal frequency $f_{CS1}$ decreases the energy transfer to boost capacitor 216 and, thus, to load 202. Conversely, switch state controller 204 increases the period T and, thus, decreases the control signal frequency $f_{CS1}$ as the input voltage $V_x(t)$ decreases.

By processing the more complicated algorithms of Equations [4] and [7] to provide power factor correction and steady state power, in at least one embodiment, the switching power converter 250 has (i) reduced component counts, e.g. the elimination of the flyback diode in Mednik and Schie, relative to conventional power converters, and (ii) a lower boost capacitor value and, thus, better efficiency.

To maintain a desired load voltage $V_L$, the switch state controller 204 receives feedback of various state parameters to control the duty cycle and frequency of control signal $C_{S1}$ and, thus, control the capacitor voltage $V_{C1}$ and output current $i_{load}$ of switching power converter 250. In at least one embodiment, the switch state controller 204 senses the output current $i_{load}$, and sets the duty cycle, $T_B/T$, for each pulse of control signal $C_{S1}$ based on the value of the output current $i_{load}$. If the output current is too high, switch state controller 204 decreases the duty cycle of control signal $C_{S1}$ by decreasing the pulse width of pulses of control signal $C_{S1}$. For example, if the output current $i_{load}$ is too high in period $T_1$, switch state controller 204 decreases the duty cycle of control signal $C_{S1}$ by decreasing the pulse width $PW_2$ relative to pulse width $PW_1$. If the output current is too low, switching power converter 250 increases the duty cycle of control signal $C_{S1}$ by increasing the pulse width of pulses of control signal $C_{S1}$. For example, if the output current $i_{load}$ is too low, switch state controller 204 increases the duty cycle of control signal $C_{S1}$ by increasing the pulse width $PW_1$ relative to $PW_0$.

The actual changes in pulse widths and periods of control signal $C_{S1}$ are generally subtle but are exaggerated in pulse train 304 for demonstrative purposes. Because of the varying decay time period $T_D$ of the input inductor 218 current during the progression of the cycle of pulse train 304, the switch state controller 204 will also vary the frequency of operation of switch 206 through the progression of the cycle to maintain power factor correction.

In at least one embodiment, switch state controller 204 determines a proper value of the output current $i_{load}$ and the capacitor voltage $V_{C1}$ based upon a known application of switching power converter 250. For example, if load 202 is a string of one or more LEDs, the LEDs have known operating characteristics. Thus, switching power converter 250 provides an output current $i_{load}$ that corresponds with a desired intensity of the LEDs. The switch state controller 204 can also respond to a dimming signal (not shown) to cause power converter 250 to decrease the output current $i_{load}$.

The values of L1, L2, and C1 of respective inductors 218 and 222 and capacitor 216 are a matter of design choice. For the LED example shown, the inductors will be in the mH range, and the capacitor will be a few mF. This capacitor size allows non-electrolytic capacitors to be used, increasing efficiency and reliability. The value of capacitor 216 is preferably chosen to be sufficiently large to maintain a capacitor voltage $V_{C1}$ that is sufficiently constant to allow load 202 to function properly during operation of switching power converter 250 operates to provide power to load 202. For example, when load 202 represents one or more LEDs, the inductors 218 and 222 are in the mH range, and the capacitor 216 will be a few mF. In this embodiment, the capacitor 216 can be implemented using a non-electrolytic capacitor, which increases efficiency and reliability.

Figure 4:
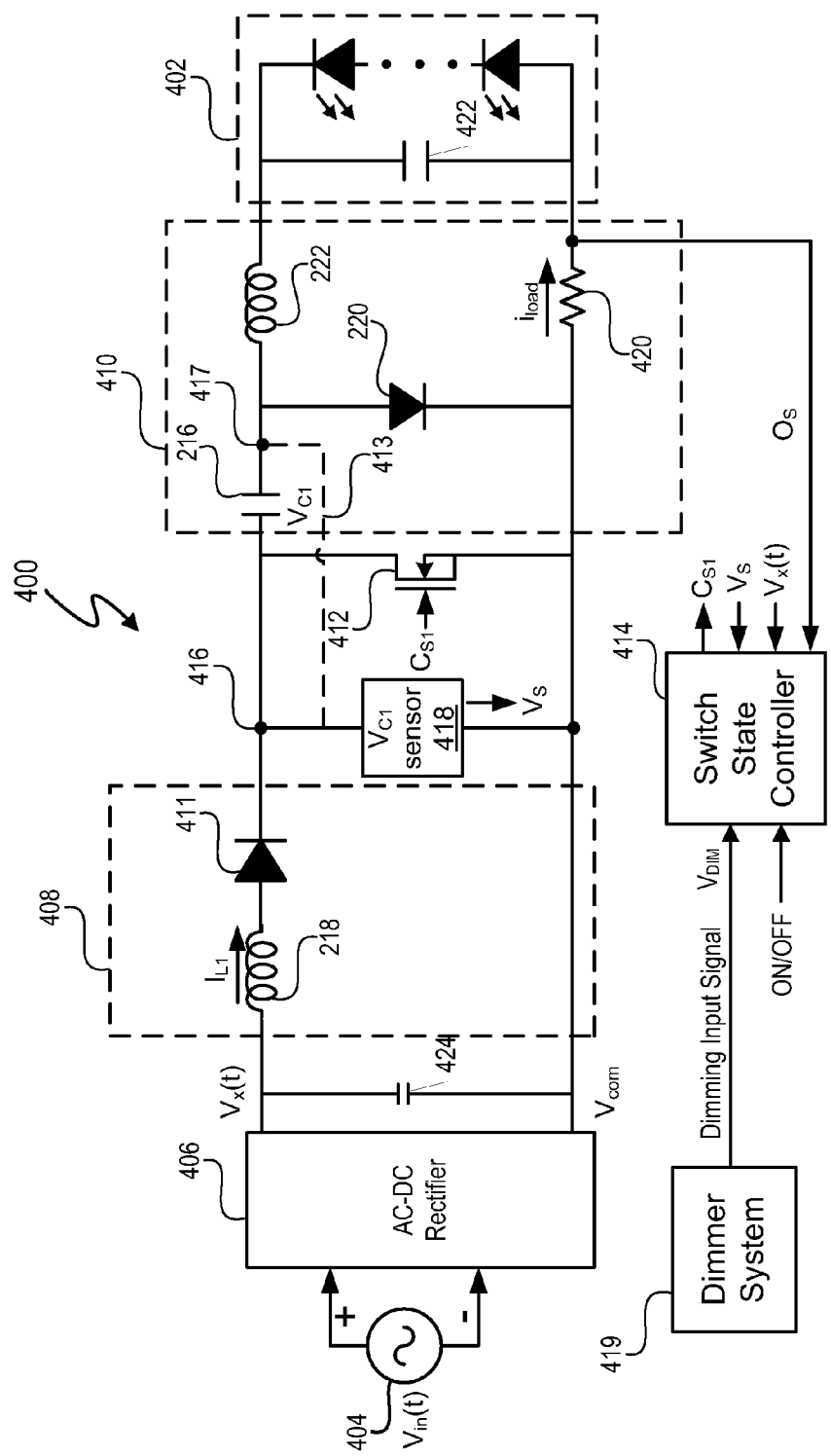
FIG. 4 depicts a switch state controller and switching power converter that converts a time-varying input voltage into power utilizable by an LED light source.

FIG. 4 depicts a switching power converter 400 that converts an AC input voltage $V_{in}$ into power for the LED light source 402. Power converter 400 represents one embodiment of switching power converter 250. An AC source 404 provides a time-varying input signal $V_{in}$ to an AC-DC rectifier 406. In at least one embodiment, AC-DC rectifier 406 is a full-bridge, diode based rectifier. In at least one embodiment, the input voltage $V_{in}$ is a 110-120 VAC, 60 Hz line voltage. In another embodiment, the input voltage $V_{in}$ is a duty cycle modified dimmer circuit output voltage. Any input voltage and frequency can be used. The rectifier 406 provides a rectified AC voltage. In at least one embodiment, capacitor 424 filters out switch 412 switching noise that occurs at the switching frequencies and associated harmonic frequencies of switch 412. The input stage 408 and driver stage 410 operate in the same way as respective input stage 201 and driver stage 203 of FIG. 2b. Diode 411 represents one embodiment of reverse current prevention circuit 214 of FIG. 2b. Switch 412 is an n-channel FET. The operation of switch 412 controls the power provided by switching power converter 400 and controls power factor correction. With fewer diodes in the active path, and lower switch current (and voltage) with comparison to conventional solutions, in at least one embodiment, switching power converter 400 increases efficiency, which also reduces the dissipated heat of switching power converter 400 relative to conventional solutions.

Switch state controller 414 represents one embodiment of switch state controller 204 of FIG. 2b. Switch state controller 414 provides the control signal $C_{S1}$ that controls the operation of switch 412. Switch state controller receives feedback of two state parameters $V_S$ and $O_S$ representing the respective capacitor voltage $V_{C1}$ at node 416 between reverse current prevention circuit 214 and capacitor 216 and the output current $i_{load}$. The capacitor voltage $V_{C1}$ is sensed by $V_{C1}$ voltage sensor 418, and the output current $i_{load}$ is sensed indirectly by sensing the voltage across a nominal valued resistor 420. In at least one embodiment, the capacitor voltage $V_{C1}$ is sensed at node 416 at the connection between capacitor 216 and the cathode of diode 411. In another embodiment (shown by the dashed connection 413), the capacitor voltage $V_{C1}$ is sensed at node 417 at the connection between capacitor 216 and inductor 222. In at least one embodiment, $V_{C1}$ voltage sensor 418 senses the voltage $V_{C1}$ when diodes 411 and 220 are reverse biased.

Switch state controller 414 receives a dimming input signal $V_{DIM}$. Dimming input signal $V_{DIM}$ can be any digital or analog signal generated by a dimmer system 419. The dimming input signal $V_{DIM}$ represents a selected dimming level with a 100% dimming level representing no light output and 0% dimming level representing full light output (i.e. no dimming) For example, in at least one embodiment, the dimming input signal $V_{DIM}$ is an AC signal, and dimmer system 419 chops voltage half cycles of dimming input signal $V_{DIM}$ to alter the duty cycle of each half cycle of dimming input signal $V_{DIM}$. The switch state controller 414 detects the duty cycle or phase of the chopped voltage half cycle to determine the dimming level indicated by the dimming input signal $V_{DIM}$.

In another embodiment, the dimmer system 419 provides a digital signal that is encoded with a selected dimming level that can be decoded directly by switch state controller 414. In at least one embodiment, the dimming input signal $V_{DIM}$ is the input voltage $V_{in}$. U.S. Provisional Patent Application Ser. No. 60/909,458, entitled "Ballast for Light Emitting Diode Light Sources", filed on Apr. 1, 2007, inventor John L. Melanson, U.S. patent application Ser. No. 11/695,023, entitled "Color Variations in a Dimmable Lighting Device with Stable Color Temperature Light Sources", filed on Apr. 1, 2007, inventor John L. Melanson, U.S. Provisional Patent Application Ser. No. 60/909,457, entitled "Multi-Function Duty Cycle Modifier", filed on Apr. 1, 2007, inventors John L. Melanson and John J. Paulos, and U.S. patent application Ser. No. 11/695,024, entitled "Lighting System with Lighting Dimmer Output Mapping", filed on Apr. 1, 2007, inventors John L. Melanson and John J. Paulos, all commonly assigned to Cirrus Logic, Inc. and collectively referred to as the "Melanson patents", describe exemplary systems for detecting the dimming level indicated by the dimming signal $V_{DIM}$. The Melanson patents are hereby incorporated by reference in their entireties.

Switch state controller 414 can also receive a separate ON/OFF signal indicating that the light source 402 should be turned ON or OFF. In another embodiment, a 0% dimming input signal $V_{DIM}$ indicates ON, and a 100% dimming input signal $V_{DIM}$ indicates OFF.

Switch state controller 414 responds to the dimming input signal $V_{DIM}$ by varying the duty cycle of control signal $C_{S1}$. As the dimming input signal $V_{DIM}$ indicates increased dimming, the switch state controller 414 responds by decreasing the duty cycle of pulses of control signal $C_{S1}$. As the dimming input signal $V_{DIM}$ indicates decreased dimming, the switch state controller 414 responds by increasing the duty cycle of pulses of control signal $C_{S1}$.

LED light source 402 includes N LEDs, and N is an integer greater than or equal to one. The capacitor 422 provides a low pass filter for the LED light source 402. In at least one embodiment, LED light source 402 is dimmed by modulating the current to LED light source 402 to change the average current supplied to LED light source 402 by power converter 400.

Thus, switch state controller 200 of FIG. 2a controls one or more internal switches of a switching power converter 240 to control the output power of the switching power converter 240 and to control power factor correction. The switch state controller 200 utilizes feedback from an output characteristic of the switching power converter 240 to control duty cycles of control signal $C_S$ and utilizes feedback from an internal node of the switching power converter 240 to control a frequency of the control signal $C_S$. Under the control of switch state controller 200, the switching power converter 240 can provide power to a variety of loads, provide a variety of output voltages, and provide a variety of output currents.

Although the present invention has been described in detail, it should be understood that various changes, substitutions and alterations can be made hereto without departing from the spirit and scope of the invention as defined by the appended claims. For example, in at least one embodiment, the switch state controller 200 can provide control signals, such as control signal $C_S$, to multiple switching power converters. Each switching power converter can be a copy of switching power converter 240, and each control signal can be determined in the same way as control signal $C_{S1}$ as described in conjunction with FIGS. 2b, 3, and 4.

What is claimed is:

1. An apparatus comprising:
   a switching power converter, wherein the switching power converter comprises:
   an input stage comprising:
   an input node to receive a time-varying input signal; and
   a first inductor coupled to the input node;

an output stage, coupled to the input stage, the output stage comprising;
    a capacitor; and
    a second inductor coupled to the capacitor;
a switch, coupled to the input stage and the output stage, to control energy transfer to the capacitor and from the capacitor to a load; and
a switch state controller, coupled to the switch, to monitor the time-varying input signal and to supply a switching power converter control signal to the switch to modulate a switching frequency of the switch in accordance with amplitude changes of the input signal, wherein the switching frequency of the switch is greater than a frequency of the input signal.

2. The apparatus of claim 1 wherein the switch state controller is configured to increase the switching frequency of the switch as the amplitude of the input signal increases and is further configured to decrease the switching frequency of the switch as the amplitude of the input signal decreases.

3. The apparatus of claim 1 wherein the switch state controller is further configured to control a duty cycle of the control signal using a feedback signal representing an output characteristic of the switching power converter.

4. The apparatus of claim 1 wherein the switch state controller is further configured to provide power factor correction for the switching power converter.

5. The apparatus of claim 1 wherein the switch state controller is further configured to cause the switching power converter to supply approximately constant current to a load with the input stage of the switching power converter operating in discontinuous inductor current mode.

6. The apparatus of claim 1 wherein the switch is further configured to control a first input current to the first inductor.

7. The apparatus of claim 1 further comprising:
    a dimmer input, coupled to the switch state controller, to receive a dimming input signal; and
    a light source; and
    wherein during the steady-state operation of the switch state controller, the control signal is modified to cause the switch to cause the output stage to generate an output current responsive to the dimming input signal to dim the light source.

8. The apparatus of claim 7 wherein the light source comprises at least one light emitting diode.

9. A method comprising:
    monitoring a time-varying input signal to a switching power converter;
    monitoring a boost capacitor voltage of a boost capacitor of the switching power converter; and
    supplying a pulse width modulated switching power converter control signal to modulate a switching frequency of a switch of the switching power converter in accordance with amplitude changes of the input signal so that the switch controls both energy transfer to the boost capacitor and from the boost capacitor to a load, wherein the frequency of the control signal is greater than a frequency of the input signal.

10. The method of claim 9 further comprising:
    increasing the frequency of the control signal as the amplitude of the input signal increases; and
    decreasing the frequency of the control signal as the amplitude of the input signal decreases.

11. The method of claim 9 further comprising:
    controlling a duty cycle of the control signal is controlled using a feedback signal representing an output characteristic of the switching power converter.

12. The method of claim 9 further comprising:
    controlling a duty cycle of the control signal using a feedback signal representing an output characteristic of the switching power converter.

13. The method of claim 9 further comprising:
    modulating the frequency of the control signal to provide power factor correction for the switching power converter.

14. The method of claim 9 wherein supplying a switching power converter control signal further comprises modifying a duty cycle of the control signal and the frequency of the control signal to cause the switching power converter to supply approximately constant current to a load.

15. The method of claim 9
    receiving a dimming input signal; and
    modifying the control signal to cause the switch to cause the switching power converter to generate an output current responsive to the dimming input signal to dim a light source.

16. The method of claim 15 wherein the light source comprises at least one light emitting diode.

17. A lighting system comprising:
    a switching power converter comprising an input stage, a driver stage having a capacitor to receive energy from the input stage, a switch coupled to the input and driver stages, an input to receive a time-varying input signal, and an output stage having a capacitor;
    a switch state controller, coupled to the switch, to generate a frequency and duty cycle modulated switch control signal to control conductivity of the switch, wherein during operation of the switch state controller the switch state controller modulates a switching frequency of the switch in accordance with amplitude changes of the input signal, wherein the switching frequency of the switch is greater than a frequency of the input signal, and the switch state controller controls a duty cycle of the control signal to control an output voltage of the switch state controller and to control energy transfer to the capacitor; and
    a light source coupled to the switching power converter.

18. The lighting system of claim 17 wherein the switch state controller is configured to increase the switching frequency of the switch as the amplitude of the input signal increases and is further configured to decrease the switching frequency of the switch as the amplitude of the input signal decreases.

19. The lighting system of claim 17 further comprising:
    a dimmer input, coupled to the switch state controller, to receive a dimming input signal; and
    wherein during the steady-state operation of the switch state controller, the control signal is modified to cause the switch to cause the output stage to generate an output current responsive to the dimming input signal to dim the light source.

20. The lighting system of claim 17 wherein the light source comprises at least one light emitting diode.

21. The lighting system of claim 1 wherein the switching power converter comprises a boost converter, and a voltage across the capacitor during operation of the switching power converter is greater than a voltage of the time-varying input signal.

22. The lighting system of claim 17 wherein the switching power converter comprises a boost converter, and a voltage across the capacitor during operation of the switching power converter is greater than a voltage of the time-varying input signal.

23. The lighting system of claim 1 wherein:
the capacitor includes a first terminal coupled to the switch and a second terminal coupled to the second inductor; and
the output stage further comprises a diode coupled between the second terminal to the capacitor and a reference node.

24. The method of claim 9 wherein:
the switching power converter further comprises an inductor and a diode;
the boost capacitor includes a first terminal coupled to the switch and a second terminal coupled to the inductor; and
the diode is coupled between the second terminal to the boost capacitor and a reference node.

25. The lighting system of claim 17 wherein:
the output stage of the switching power converter further comprises an inductor and a diode;
the capacitor includes a first terminal coupled to the switch and a second terminal coupled to the inductor; and
the diode is coupled between the second terminal to the capacitor and a reference node.

\* \* \* \* \*